(12) United States Patent
Sihler et al.

(10) Patent No.: US 8,373,307 B2
(45) Date of Patent: Feb. 12, 2013

(54) METHODS AND SYSTEMS FOR DIRECT CURRENT POWER TRANSMISSION

(75) Inventors: Christof Martin Sihler, Hallbergmoos (DE); Robert Roesner, Unterfoehring (DE); Kiruba Sivasubramaniam Haran, Clifton Park, NY (US); Sumit Bose, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/116,652

(22) Filed: May 26, 2011

(65) Prior Publication Data

US 2012/0025535 A1 Feb. 2, 2012

(51) Int. Cl.
*H02J 1/00* (2006.01)
(52) U.S. Cl. .......................................... 307/69
(58) Field of Classification Search ............. 307/69, 307/77, 82
See application file for complete search history.

(56) References Cited

U.S. PATENT DOCUMENTS

| | | | | |
|---|---|---|---|---|
| 3,595,982 | A * | 7/1971 | Kafka | 174/15.5 |
| 4,788,448 | A | 11/1988 | Crowe | |
| 6,262,375 | B1 * | 7/2001 | Engelhardt et al. | 174/125.1 |
| 7,633,770 | B2 * | 12/2009 | Datta et al. | 363/35 |
| 7,880,419 | B2 | 2/2011 | Sihler et al. | |
| 2009/0273956 | A1 * | 11/2009 | Castelli Dezza et al. | 363/67 |
| 2011/0057446 | A1 * | 3/2011 | Mayor Lusarreta et al. | 290/44 |

FOREIGN PATENT DOCUMENTS

| | | | |
|---|---|---|---|
| GB | 2420233 | A | 5/2006 |
| JP | 2006291946 | A | 10/2006 |
| WO | 0074198 | A1 | 12/2000 |
| WO | 0152379 | A2 | 7/2001 |
| WO | 2008002226 | A1 | 1/2008 |
| WO | 2009082708 | A1 | 7/2009 |

OTHER PUBLICATIONS

Olsen, S.K.; Tonnesen, O.; Ostergaard, J.; , "Power applications for superconducting cables in Denmark," Applied Superconductivity, IEEE Transactions on , vol. 9, No. 2, pp. 1285-1288, Jun. 1999.*
Hirose et al., "High-Temperature Superconducting (HTS) DC Cable"; SEI Technical Review, Jan. 2006; pp. 29-35; No. 61.
Walrod, et al., "Development and Test of a Medium Voltage Converter for Ocean Observatories", Mar. 1, 2010, 6 pages; Long Beach, Mississippi.
Davidson et al., "The Future of High Power Electronics in Transmission and Distribution Power Systems"; 13th European Conference on Power Electronics and Applications, Abstract only, Oct. 6, 2009; 1 page, Barcelona, Spain.
Ghani et al., "An Adaptive Hysteresis Band Current Controller for Inverter Base DG with Reactive Power Compensation", Power Electronic & Drive Systems & Technologies Conference, Abstract only, May 24, 2010, 1 page, Tehran, Iran.

* cited by examiner

*Primary Examiner* — Daniel Cavallari
(74) *Attorney, Agent, or Firm* — Ann M. Agosti

(57) ABSTRACT

A direct current (DC) power transmission system is described. The DC power transmission system includes a first plurality of series connected power collection systems and at least one superconducting DC conductor coupled to the plurality of series connected power collection systems and configured to transmit power generated by the plurality of power collection systems to a remote load.

10 Claims, 5 Drawing Sheets

METHODS AND SYSTEMS FOR DIRECT CURRENT POWER TRANSMISSION

BACKGROUND OF THE INVENTION

The embodiments described herein relate generally to transmission of power from a plurality of remotely located power generation systems, and more specifically, to direct current (DC) transmission of power from the power generation systems to a remote location via a superconducting DC cable transmission system.

In distributed generation applications, the site of power generation is remote from the available electric grid or load point and bulk power is often transmitted over long distances. In an off-shore wind farm, for example, power generated by individual wind turbine generators typically is processed by power electronic converters to convert a variable voltage, variable frequency output to a fixed voltage, fixed frequency output. The individual wind turbine generators operate at different speeds and therefore the frequency of the output of each generator may be different. When an alternating current (AC) transmission system is used to transmit the generated power to the on-shore electric grid, the outputs from the individual generators must be synchronized to the utility network frequency before applying the power to the electric grid. The power generated from the turbines is then brought together by a collection system that includes transformers and switchgears for isolating individual turbines and stepping up the voltages, usually to tens of kilovolts. The collection system is cabled to an off-shore substation that increases the voltage further, usually to hundreds of kilovolts (kV). It is then transmitted through subsea cable to an on-shore substation, where it is coupled to the on-shore electric grid through isolating switch-gears and transformers.

For applications where bulk power is transmitted over long distances, conventional high voltage alternating current (HVAC) transmission provides technical challenges. Furthermore, HVAC transmission lines are inconvenient for use in densely populated areas and are not an efficient solution for off-shore wind farms where subsea cables must be used for power transmission. Capacitance causes charging current to flow along the length of an AC cable. Because the AC cable must carry this current as well as the useful source current, this physical limitation reduces the source carrying capability of the AC cable. Because capacitance is distributed along the entire length of the cable, longer lengths result in higher capacitance and higher resulting charging current. To transmit the charging current and the useful source current, the AC cables must be over-rated, which increases the cost of the AC cable. As the cable system design voltage is increased to minimize the line losses and voltage drop, the charging current also increases.

DC transmission can be achieved more efficiently over longer distances than AC transmission. Medium voltage (MV) or high voltage (HV) DC transmission typically requires power electronic converters which are capable of converting between HVAC and HVDC. Power generation systems that utilize DC transmission typically include a plurality of AC to DC converters that are coupled in parallel and voltage controlled. The voltage level of the power transmitted over the DC cable is maintained substantially constant, while a current level varies depending on the power output of the plurality of generators. If a fault occurs within the voltage controlled system, the voltage level is maintained substantially constant, while the current may rapidly increase. Although DC collection and transmission systems have several advantages over AC systems, voltage controlled DC transmission systems are most commonly used in military and research applications because expensive switchgear is needed to perform interrupt functions due to high short circuit current in a parallel DC topology.

Furthermore, high voltages are typically utilized in high power transmission, for example, in the range of hundreds of kilovolts (kV) to transmit hundreds of megawatts (MW) of power, since high current power transmission is less efficient than high voltage power transmission. Typical, HVDC power conversion is expensive and complex, especially at high power levels because of the level of transmission voltage needed for high power transmission. For example, to not exceed acceptable transmission losses for a bulk power transmission of, for example, 300 MW, a transmission voltage of upwards of 200 kV may be required.

High temperature superconducting (HTS) cables are available for AC power transmission and for DC power transmission. HTS cables have high conductivity, and therefore, low transmission losses, which reduces a transmission voltage level needed for long distance power transmission. HTS AC cables are expensive relative to the cost of HTS DC cables. Furthermore, HTS DC cables configured to transmit power having a current that varies are more complex and expensive than HTS DC cables configured to transmit power having substantially constant current. A varying current causes a changing magnetic field within a HTS DC cable, which creates eddy current losses and reduces power transmission efficiency. In a voltage controlled DC transmission system, the current may vary enough to prevent efficient power transmission using an HTS DC cable.

BRIEF DESCRIPTION OF THE INVENTION

In one aspect, a direct current (DC) power transmission system is provided. The system includes a first plurality of series connected power collection systems and at least one superconducting DC conductor coupled to the plurality of series connected power collection systems and configured to transmit power generated by the plurality of power collection systems to a remote load.

In another aspect, a method for direct current (DC) power transmission is provided. The method includes coupling a first plurality of power collection systems in series with at least one superconducting DC conductor to form a first transmission circuit for transmission of power to a remote load. The method also includes configuring the first plurality of power collection systems to provide a substantially constant current to the first transmission circuit.

In yet another aspect, a direct current (DC) power transmission system is provided. The system includes a first wind turbine generator coupled to a first alternating current (AC) to direct current (DC) converter. The system also includes a second wind turbine generator coupled to a second AC to DC converter. The system also includes at least one superconducting DC conductor coupled in series with the first AC to DC converter and the second AC to DC converter and configured to transmit power generated by at least one of the first wind turbine generator and the second wind turbine generator to a remote load.

DETAILED DESCRIPTION OF THE INVENTION

The methods and systems described herein facilitate transmitting power from a source to a load. More specifically, a power transmission system is configured such that power is transmitted at a substantially constant current which facilitates use of a superconducting direct current (DC) cable. The methods and systems described herein transmit DC power at a medium voltage level which allows for a simplified DC collector system when compared to high voltage DC (HVDC) power transmission. The simplified DC collector system includes single-conductor DC interconnection cables between the wind turbines that are less costly than three-phase cables and facilitate use of simpler and smaller turbine-level converters. Moreover, turbine-level transformers and circuit-breakers in the collector system are not required.

Technical effects of the methods and systems described herein include at least one of: (a) coupling a first plurality of power collection systems in series with at least one superconducting DC conductor to form a first transmission circuit for transmission of power to a remote load; and (b) configuring the first plurality of power collection systems to provide a substantially constant current to the first transmission circuit.

Figure 1:
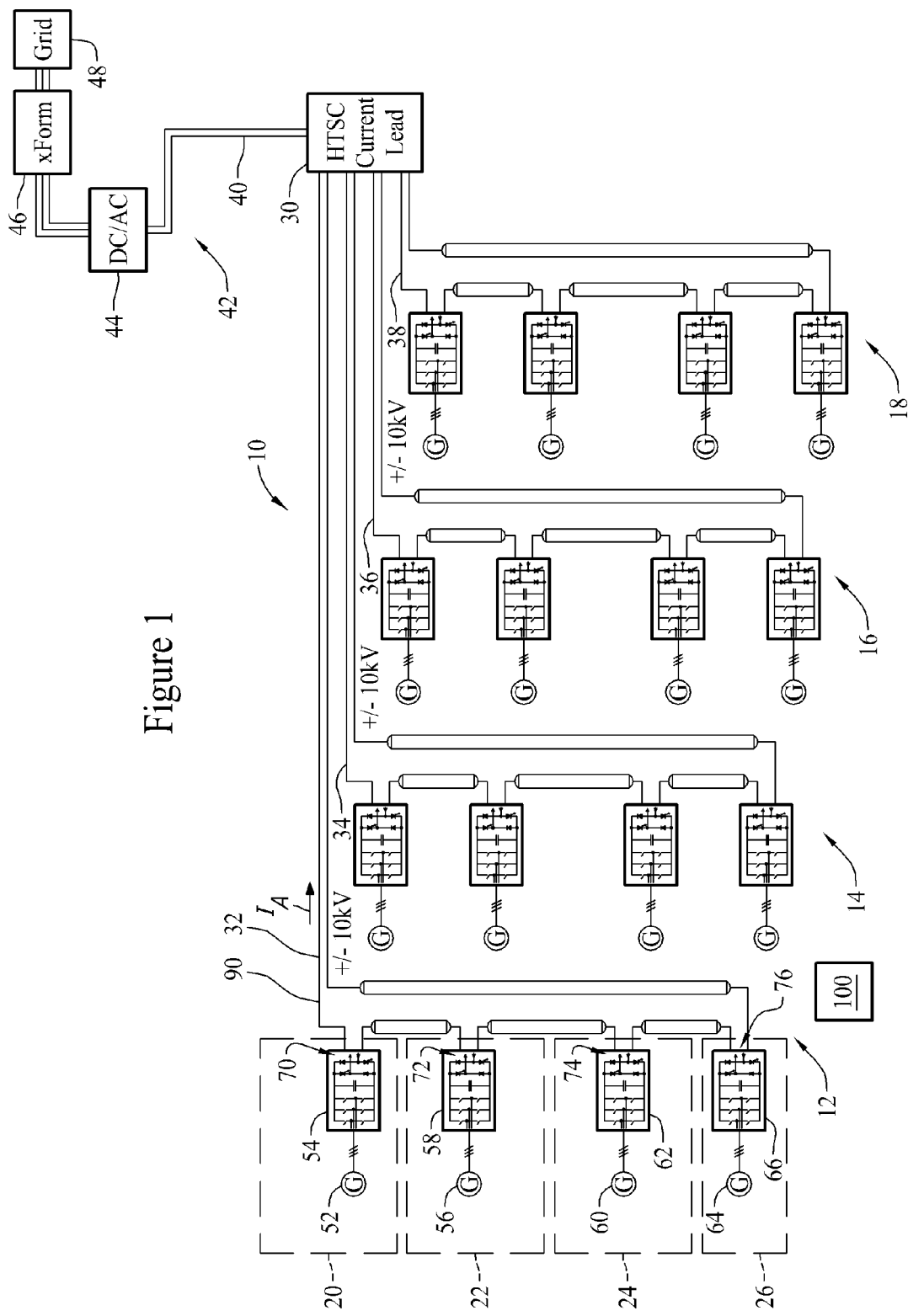
FIG. 1 is a block diagram of an exemplary power generation and transmission system.

FIG. 1 is a block diagram of an exemplary power generation and transmission system 10. In the exemplary embodiment, system 10 includes a first plurality of power collection systems 12, a second plurality of power collection systems 14, a third plurality of power collection systems 16, and a fourth plurality of power collection systems 18. Furthermore, in the exemplary embodiment, first plurality of power collection systems 12 includes a first power collection system 20, a second power collection system 22, a third power collection system 24, and a fourth power collection system 26. Each of power collection systems 12, 14, 16, and 18 are coupled to a superconducting direct current (DC) conductor connector 30. For example, first plurality of power collection systems 12 is coupled to superconducting DC conductor connector 30 by a first conductor 32, for example, a single-phase DC interconnection cable, also referred to herein as a first DC link. Similarly, second plurality of power collection systems 14 is coupled to connector 30 by a second conductor 34, third plurality of power collection systems 16 is coupled to connector 30 by a third conductor 36, and fourth plurality of power collection systems 18 is coupled to connector 30 by a fourth conductor 38. Although described herein as including four sets of power collection systems, system 10 may include any suitable number of power collection systems that allows system 10 to function as described herein.

In the exemplary embodiment, superconducting DC conductor connector 30 is coupled to at least one high temperature superconducting DC conductor 40 for transmission of the power generated by systems 12, 14, 16, and 18 to a remote location 42. Remote location 42 may include a DC to AC inverter 44 and a transformer 46 for conditioning the power received via DC conductor 40 for application to a load, for example, an AC power grid 48. In the exemplary embodiment, superconducting DC conductor connector 30 reduces a temperature of conductors 32, 34, 36, and 38, and couples conductors 32, 34, 36, and 38 to superconducting DC conductor 40. Furthermore, in the exemplary embodiment, the at least one superconducting DC conductor 40 is included within a superconducting DC cable that includes a plurality of electrically isolated superconducting DC conductors. The electrical isolation between each DC link allows each DC link to operate independently from the DC links. For example, a current within all DC links may be substantially similar, however, each DC link may have a different DC link voltage.

In the exemplary embodiment, first power collection system 20 includes at least one power source 52 coupled to a first AC to DC power converter 54. Furthermore, second power collection system 22 includes at least one power source 56 coupled to a second AC to DC power converter 58, third power collection system 24 includes at least one power source 60 coupled to a third AC to DC power converter 62, and fourth power collection system 26 includes at least one power source 64 coupled to a fourth AC to DC power converter 66.

In the exemplary embodiment, DC output terminals 70, 72, 74, and 76 of AC to DC power converters 54, 58, 62, and 66, respectively, are coupled in series with superconducting DC cable connector 30 to form a first power transmission circuit 90. Although illustrated as coupling a single power source to first circuit 90, each AC to DC power converter 54, 58, 62, and/or 66 may couple a plurality of power sources to first circuit 90. Furthermore, although described as including four power sources and four AC to DC power converters, first circuit 90 may include any suitable number of series connected power sources and AC to DC power converters. Moreover, in the exemplary embodiment, upon receipt of a disconnect command signal, each AC to DC power converter 54, 58, 62, and 66 is configured to short circuit respective DC output terminals 70, 72, 74, and 76 of the power converter. For example, short circuiting DC output terminals 70 of AC to DC power converter 54 disconnects AC to DC power converter 54 from first power transmission circuit 90 without interrupting operation of AC to DC power converters 58, 62, and 66. Disconnecting AC to DC power converter 54 facilitates preventing a fault within AC to DC power converter 54 and/or power source 52 from damaging other components within first circuit 90. This feature enables the elimination or reduction of DC circuit breakers. Furthermore, by connecting AC to DC power converters 54, 56, 62, and 66 in series, the nominal voltage of the individual AC to DC power converters need not be high. For example, in one embodiment, the nominal voltage is less than or equal to about ten kilovolts (kV) to twenty kV. In another example, the nominal voltage is less than or equal to about thirty kilovolts.

In the exemplary embodiment, first plurality of power collection systems 12 is current controlled. Current control prevents fast current rise within first circuit 90 which provides protection against malfunctions. Furthermore, controlling the current within first circuit 90 to be substantially constant facilitates use of superconducting DC cable 40. The low transmission losses that occur within superconducting DC cable 40 make it possible to economically transmit high power, for example, 200 MW, at a medium voltage level, for example, 10 kV and 20 kA. Furthermore, in the exemplary embodiment, superconducting DC cable connector 30 couples power collection systems 12, 14, 16, and 18 to DC cable 40. Each of power collection systems 12, 14, 16, and 18 may output power at 10 kV and 20 kA, wherein DC cable 40 would transmit 800 MW to remote location 42.

Within first power transmission circuit 90, current entering and leaving each AC to DC power converter 54, 58, 62, and 66 is equal to the current supplied by the source side of power generation and transmission system 10. In other words, AC to DC power converters 54, 58, 62, and 66 maintain a current ($I_A$) on system DC link 32. The commanded current ($I_A$) on system DC link 32 is selected as a minimum current needed to support the maximum current required by any one of AC to DC power converters 54, 58, 62, and 66 to supply appropriate power to remote location 42. Thus, system 10 is most efficient when power sources 52, 56, 60, and 64 have substantially similar power output capabilities. A feedback loop can be used to enable a controller 100 to determine a current command for system DC link 32. In the exemplary embodiment, controller 100 drives the current ($I_A$) within system DC link 32 toward the commanded value. As indicated above, the commanded value will typically depend upon the source requirements and may be adjusted from time to time to adapt to changing requirements. In the exemplary embodiment, controller 100 is communicatively coupled to converters 54, 58, 62, and 66 via conductors and/or via wireless communications. In an alternative embodiment, the current in first circuit 90 is controlled by DC to AC inverter 44. Control of the current by DC to AC inverter 44 does not require feedback communication to the individual converters 54, 58, 62, and 66.

DC power transmission is particularly useful for transmitting bulk electrical power having at least a medium DC voltage level, for example, at least 10 kV. Typically, a distance from power collection system 12 to location 42 is distant or remote when it is greater than twenty kilometers. However, what is considered "distant" will vary depending upon power requirements of the system. Additionally, some applications may exist wherein the benefits of stringing AC to DC converters 54, 58, 62, and 66 using DC power transmission are not dependent upon long distances. When used to supply power from sources situated off-shore, the embodiment of FIG. 1 is expected to reduce cost, complexity, and required space for power conversion equipment. For example, cost, complexity, and required space may be reduced by reducing a number of components such as circuit breakers, transformers, and connectors within system 10.

In the exemplary embodiment, one or more of power sources 52, 56, 60, and 64 includes a wind turbine generator or, more specifically, generators of wind turbines situated off-shore. Although described herein with respect to transmission of power from an off-shore wind farm to an on-shore power system, the methods and systems described herein may be applied generally to any power transmission or distribution application.

In the exemplary embodiment, AC to DC power converters 54, 58, 62, and 66 are three-phase power converters. In a more specific example, the power converters comprise two level converters, three level converters, or a combination of two level converters and three level converters. In other examples, a higher number of levels may be used. In an alternative embodiment, the individual, series-connected AC to DC power converters 54, 58, 62, and 66 may be controlled in an interleaved manner, which improves power quality without use of filters in the power system. Furthermore, although not illustrated in FIG. 1, a transformer may be coupled between, for example, power source 52 and AC to DC converter 54 for increasing a voltage level of the power provided to AC to DC converter 54.

Figure 2:
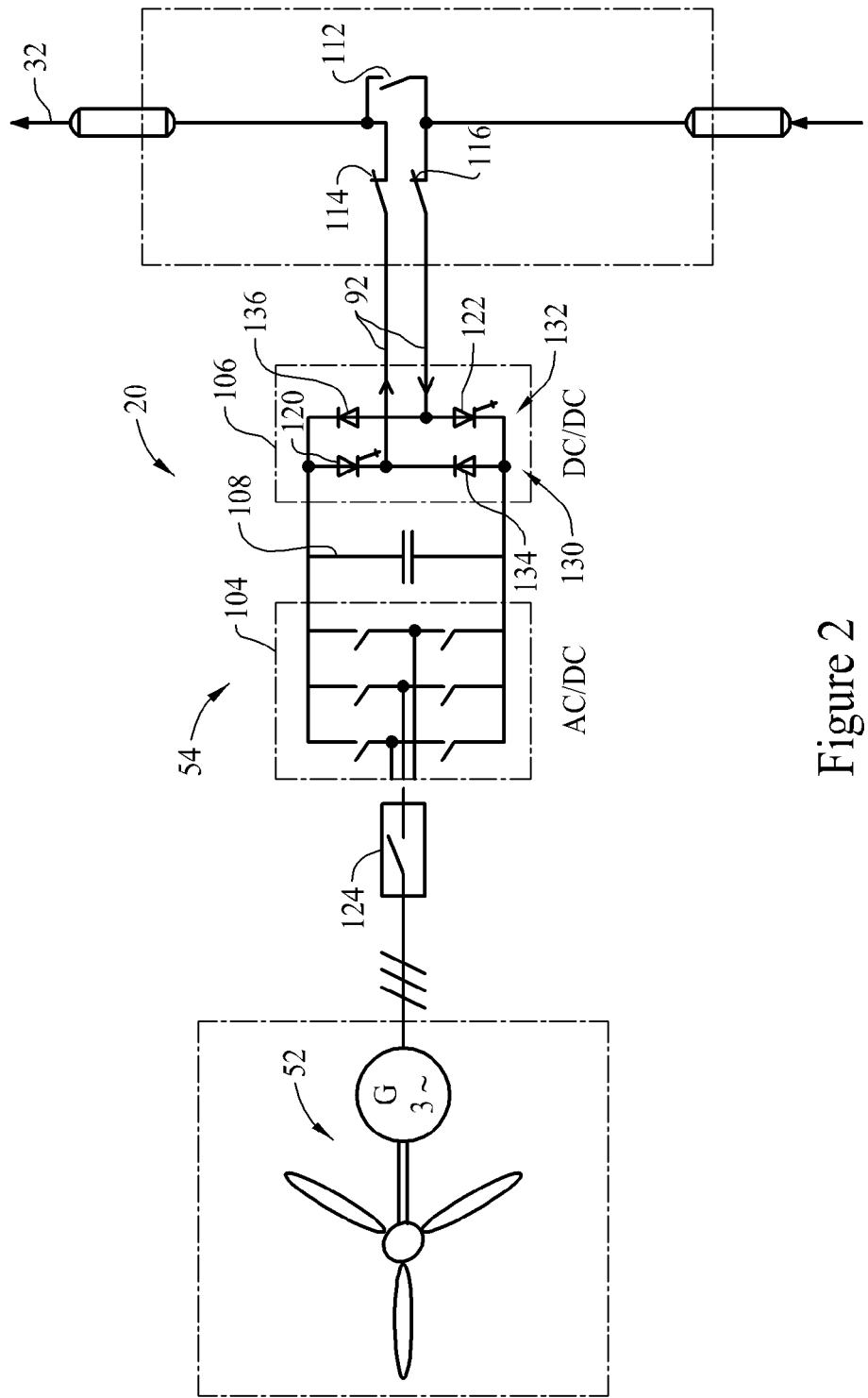
FIG. 2 is a block diagram of an exemplary power collection system that may be included within the power generation and transmission system of FIG. 1.

FIG. 2 is a block diagram of an exemplary embodiment of power collection system 20 (shown in FIG. 1), which may be included within power generation and transmission system 10 (shown in FIG. 1). In the exemplary embodiment, AC to DC power converter 54 includes a rectifier section 104 and a half-bridge section 106 that is coupled between system DC link 32 and rectifier section 104. A module DC link 108 couples half-bridge section 106 and rectifier section 104. Rectifier section 104 may include a conventional conversion module using semiconductor switching devices such as insulated gate transistors (IGBT), gate turn-off thyristors (GTO), or other transistors and associated controls.

In the exemplary embodiment, a first switch 112, a second switch 114, and a third switch 116 are coupled to DC link 32. In the exemplary embodiment, first switch 112, second switch 114 and third switch 116 are isolating switches that facilitate isolating power collection system 20 if a fault occurs. More specifically, in the exemplary embodiment, switches 112, 114, and 116 are not DC circuit breakers, but rather, are no-load switches. Furthermore, upon occurrence of a fault in power source 52 and/or AC to DC converter 54, one of the half-bridge section 106 switches 120 and 122 is closed so as to short circuit half-bridge DC terminals 70 and thus ensure that the rest of power generation and transmission system 10 is not affected by the fault.

In at least some embodiments, switch 112 may also be closed in order to permit the capacitance of module DC link 108 to be discharged, after closing both switches 120 and 122. Switches 120 and 122 may then be opened along with switches 114 and 116 at which point AC to DC converter 54 is completely separated from power source 52 and DC link 32 and can be removed for maintenance, repair or replacement while power generation and transmission system 10 remains in operation. Later reinsertion of AC to DC converter 54 is possible by short-circuiting half-bridge section 106 and then opening switch 112.

Half-bridge section 106 controls current to system DC link 32, whereas rectifier section 104 controls the voltage across module DC link 108. The power to system DC link 32 may be adjusted by controlling the current, the voltage, or a combination of the current and voltage. In an exemplary embodiment, half-bridge section 106 includes two diode switch pairs 130 and 132 which each include one diode 134 or 136 and one switch 120 or 122. Half-bridge section 106 is configured for receiving input power from rectifier section 104 and transmitting to system DC link 32 when both of the switches 120 and 122 of diode switch pairs 130 and 132 are closed. Switches 120 and 122 may comprise any appropriate switching devices with several examples including IGBTs and/or GTOs.

When one power source, for example, first power source 52, supplies less power than each of the other power sources within first circuit 90 (i.e., power sources 56, 60, and 64), the fraction of the DC ring current ($I_A$) that is not supplied by first power source 52 will be bypassed by AC to DC power converter 54 and result in some efficiency losses, particularly if there is a large difference in generated power between different sources. The bypass is a partial bypass with the half-bridge switches 120 and/or 122 being modulated, and a duty ratio being selected, to lower the resulting power supplied to system DC link 32. Components at remote location 42, for example, DC to AC inverter 44 and/or transformer 46, sense the lower power transmitted by system 10 and adjust operation to balance the load to the power delivered by system 10. More specifically, in embodiments where DC to AC inverter 44 controls the DC ring current ($I_A$), DC to AC inverter 44 adjusts an onshore DC link voltage to a value that corresponds to the sum of the individual offshore converter voltages form, to balance the onshore and offshore voltages.

In the exemplary embodiment, controller 100 closes one of switches 120 and 122 in the event of a fault condition. For example, if there is a short circuit in module DC link 108 between half-bridge section 106 and rectifier section 104, half-bridge section 106 can bypass the source (i.e., bypass and de-couple source 52 and respective power converter 54 from system DC link 32). Controller 100 may include one or more computers or processors (which may be situated locally, remotely, or both locally and remotely) configured for sending command signals to switches of half-bridge section 106 and rectifier section 104, for example, and thus short circuit DC terminals 70 of AC to DC converter 54 at system DC link 32. If either of switches 120 or 122 is closed (i.e., turned "on"), then AC to DC converter 54 is bypassed and no power is transferred from power source 52 to system DC link 32. This short circuiting (or decoupling) feature is an alternative to safety devices, for example, DC circuit breakers. Furthermore, AC to DC converter 54 may independently remain in operation when another AC to DC converter, for example, AC to DC converter 58, within first circuit 90 is in a short circuit condition. When one or more AC to DC converters are bypassed on one side of the system DC link, the resulting system DC link voltage equals the sum of the remaining half-bridge voltages. Controller 100 automatically adjusts the sum of the half-bridge voltages on the other side of the system DC link in order to keep the DC ring current ($I_A$) at a constant value. Thus the power transmitted from the source is instantaneously adapted by adapting the system DC link voltage.

Figure 3:
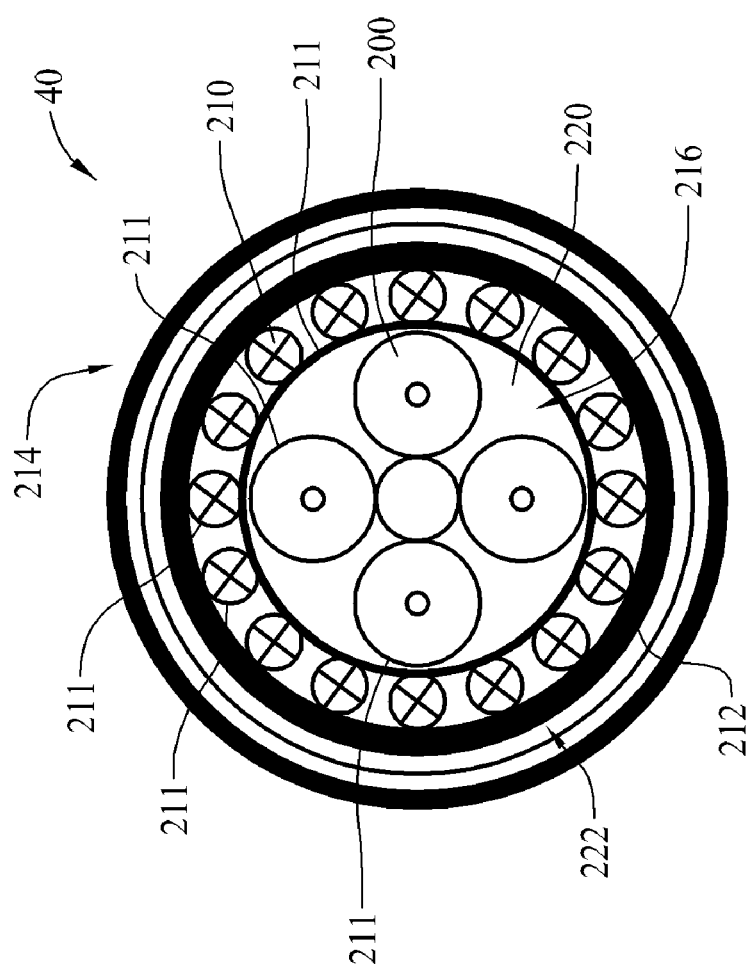
FIG. 3 is a cross-sectional view of an exemplary superconducting direct current cable for use with the power generation and transmission system of FIG. 1.

FIG. 3 is a cross-sectional view of an exemplary embodiment of superconducting direct current cable 40 (shown in FIG. 1). In the exemplary embodiment, superconducting DC cable 40 includes a first set of conductors 200 and a second set of conductors 210. First set of conductors 200 are coupled to power collection systems 12, 14, 16, and 18 (shown in FIG. 1) and configured to transmit power from power collection systems 20, 22, 24, and 26 to a remote load, for example, AC grid 48 (shown in FIG. 1). Second set of conductors 210 a return path between AC grid 48 and power collection systems 12, 14, 16, and 18.

In the exemplary embodiment, first and second set of conductors 200 and 210, separated by an electrical insulation 211, are enclosed at least partially within a thermal insulation shield 212. Furthermore, each individual conductor within first and second set of conductors 200 and 210 is separated by electrical insulation 211. Thermal insulation shield 212 minimizes heat invasion from an exterior 214 of DC cable 40 to interior 216 of DC cable 40. Furthermore, thermal insulation shield 212 also maintains a liquid or gaseous refrigerant 220 within interior 216 of superconducting DC cable 40. In some embodiments, thermal insulation shield 212 may include a vacuum insulation 222 to further minimize heat invasion from exterior 214 of DC cable 40 to interior 216 of DC cable 40. First and second set of conductors 200 and 210 are surrounded and cooled by liquid or gaseous refrigerant 220, which may include, for example only, liquid nitrogen. Liquid or gaseous refrigerant 220 may flow in a first direction in a first channel within DC cable 40 and return by flowing in a second, opposite direction in a second channel within DC cable 40. In the exemplary embodiment, superconducting DC cable 40 is current optimized, wherein currents within each sub-cable of said first and second set of conductors 200 and 210 are controlled to be substantially constant and identical at all times.

Figure 4:
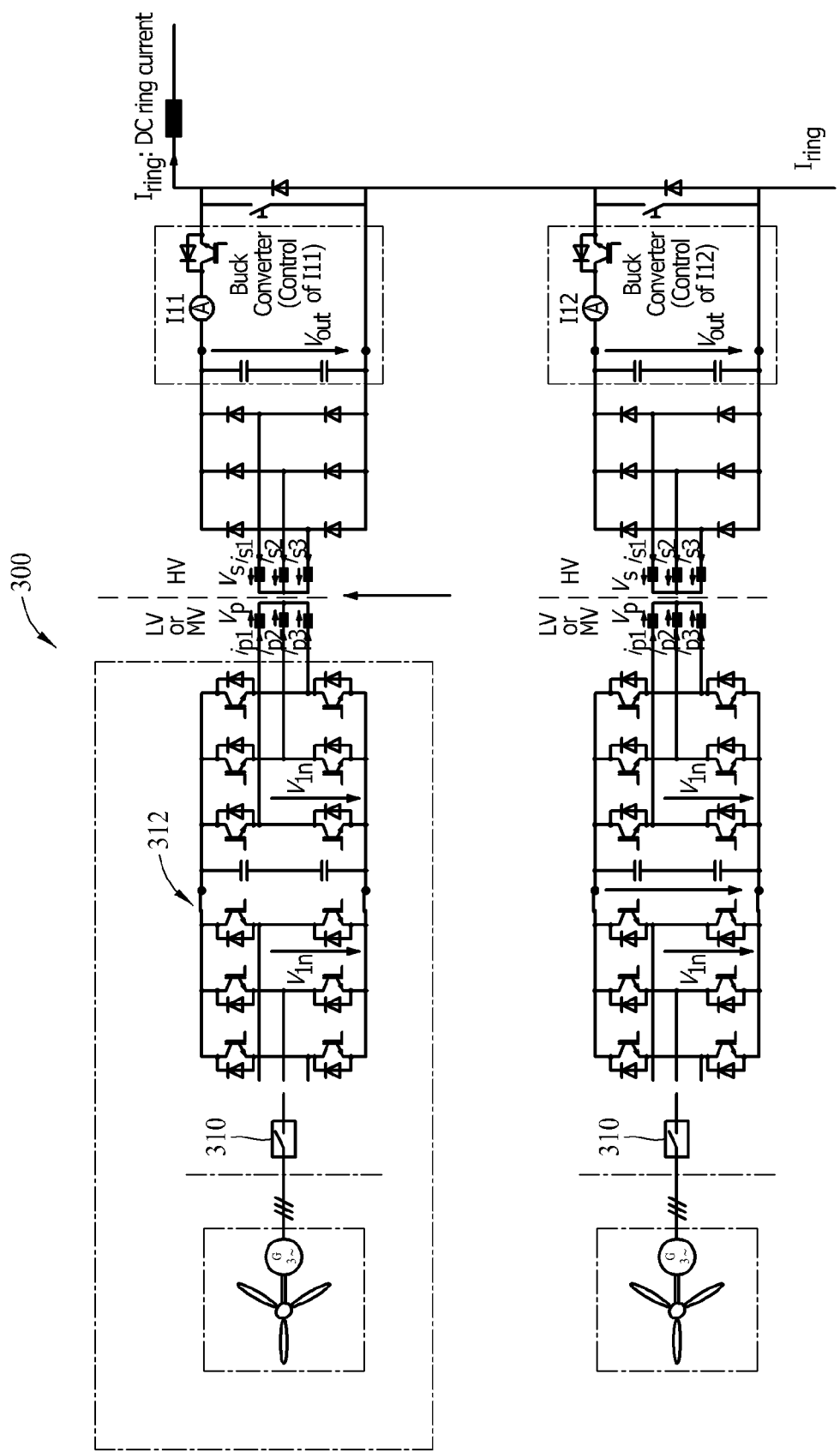
FIG. 4 is a circuit diagram of an alternative embodiment of a portion of the power generation and transmission system shown in FIG. 1.

FIG. 4 is a circuit diagram of an alternative embodiment 300 of power generation and transmission system 10 (shown in FIG. 1). In the alternative embodiment, each AC to DC converter includes, or is coupled to, a transformer 310. Transformer 310 increases the voltage level of the power provided to AC to DC converter. Furthermore, AC to DC converter includes a buck converter 312. Although described as including a buck converter, AC to DC converter may include any type of converter that allows power generation and transmission system 300 to function as described herein.

Figure 5:
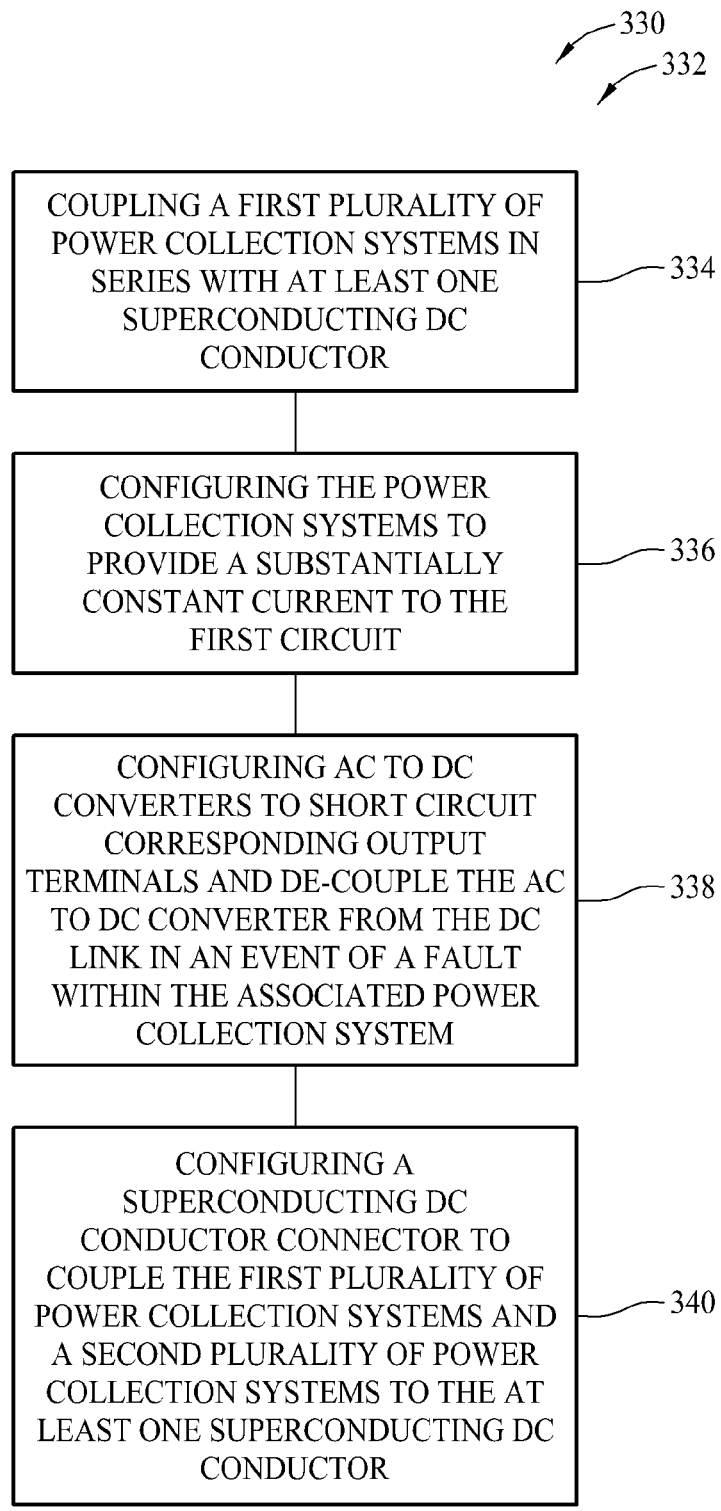
FIG. 5 is a flow chart of an exemplary method for transmitting power using the power generation and transmission system shown in FIG. 1.

FIG. 5 is a flow chart 330 of an exemplary method 332 for transmission of power, for example, from a remote power source, for example, power sources 52, 56, 60, and 64 (shown in FIG. 1) to an on-shore power system, for example, AC grid 48 (shown in FIG. 1). In the exemplary embodiment, method 332 includes coupling 334 a first plurality of power collection systems, for example, power collection systems 12 (shown in FIG. 1) in series with at least one superconducting DC conductor, for example, DC cable 40 to form a first transmission circuit, for example, first circuit 90 (shown in FIG. 1), for transmission of power to a remote load, for example, AC grid 48. More specifically, power collection systems 12 include AC to DC converters 54, 58, 62, and 66. In the exemplary embodiment, outputs 70, 72, 74, and 76 of AC to DC converters 54, 58, 62, and 66 are coupled 334 in series to form first transmission circuit 90, wherein each of AC to DC converters 54, 58, 62, and 66 are configured to receive a power output of at least one of power sources 52, 56, 60, and 64.

In the exemplary embodiment, method 332 also includes configuring 336 power collection systems 12 to provide a substantially constant current to first circuit 90. For example, AC to DC converters 54, 58, 62, and 66 may be configured 336 to output a substantially constant current.

In the exemplary embodiment, method 332 also includes configuring 338 AC to DC converters 54, 58, 62, and 66 to short circuit corresponding output terminals 70, 72, 74, and/or 76 and de-couple the AC to DC converter from the DC link in an event of a fault within the associated power collection system. For example, AC to DC converter 54 is configured 338 to short circuit output terminals 70, which de-couples AC to DC converter 54 from DC link 32 in an event of a fault within first power collection system 20.

In the exemplary embodiment, method 332 also includes configuring 340 a superconducting DC conductor connector, for example, connector 30 (shown in FIG. 1), to couple first plurality of power collection systems 12 and a second plurality of power collection systems, for example, second plurality of power collection systems 14 (shown in FIG. 1), to DC cable 40. Second plurality of power collection systems 14 are coupled in series with DC cable 40 and form a second transmission circuit for transmission of power to AC grid 48.

Described herein are exemplary methods and systems for transmitting power from a source to a load via a superconducting DC cable. Medium voltage power transmission is accomplished utilizing the high power density of the superconducting DC cable. The methods and systems described herein include a current controlled topology used to optimize the DC current magnitude and current distribution in the superconducting DC cable by feeding individual sub-cables within the DC cable with power from different collector systems.

The methods and systems described herein facilitate efficient and economical transmission of power from an off-shore wind farm to an on-shore power system. Exemplary embodiments of methods and systems are described and/or illustrated herein in detail. The methods and systems are not limited to the specific embodiments described herein, but rather, components of each apparatus, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct current (DC) power transmission system comprising:
    a first plurality of series connected power collection systems, wherein each of the first plurality of series connected power collection systems includes a power source;
    a plurality of alternating current (AC) to direct current (DC) power converters coupled to respective series connected power collection systems of the first plurality of series connect power collection systems, wherein each of the AC to DC power converters comprises at least one half bridge section; and
    at least one superconducting DC conductor configured to transmit power generated by said plurality of power collection systems to a remote load, the superconducting DC conductor further comprising a first set of conductors radially surrounded by a second set of conductors,
    wherein conductors of the first set of conductors are electrically isolated from each other,
    wherein at least one conductor of the first set of conductors is electrically coupled to the first plurality of series connected power collection systems via at least one of the AC to DC converters such that the at least one half bridge section of the at least one of the AC to DC converters maintains constant current at the at least one superconducting DC conductor based on current supplied by each of the first plurality of series connected power collection systems.

2. A DC power transmission system in accordance with claim 1, wherein said power source comprises a wind turbine generator.

3. A DC power transmission system in accordance with claim 1, wherein said AC to DC converters and said at least one superconducting DC conductor are coupled in series to form a first transmission circuit.

4. A DC power transmission system in accordance with claim 1, further comprising a controller coupled to said AC to DC converters and configured to control the level of current output by said AC to DC converters.

5. A DC power transmission system in accordance with claim 1, further comprising a superconducting direct current (DC) conductor connector configured to couple said AC to DC converters to said at least one superconducting DC conductor.

6. A DC power transmission system in accordance with claim 5, wherein said superconducting DC conductor connector further couples a second plurality of series connected power collection systems to said at least one superconducting DC conductor.

7. A DC power transmission system in accordance with claim 1, further comprising at least one isolating switch coupled between output terminals of said AC to DC converter and configured to isolate said power source in an event of a fault within a corresponding power collection system.

8. A DC power transmission system in accordance with claim 7, wherein a first AC to DC converter of said AC to DC converters is configured to independently remain in operation when output terminals of another of said AC to DC converters are short circuited.

9. A DC power transmission system in accordance with claim 1, wherein the at least one half bridge section comprises a plurality of diode-switch pairs.

10. A direct current (DC) power transmission system comprising:
    a first wind turbine generator coupled to a first alternating current (AC) to direct current (DC) converter, wherein the first AC to DC converter comprises a first half bridge section;
    a second wind turbine generator coupled to a second AC to DC converter, wherein the second AC to DC converter comprises a second half bridge section; and
    at least one superconducting DC conductor coupled in series with said first AC to DC converter and said second AC to DC converter and configured to transmit power generated by at least one of said first wind turbine generator and said second wind turbine generator to a remote load, the at least one superconducting DC conductor further comprising a first set of electrically isolated conductors radially surrounded by a second set of conductors, at least one of the first set of conductors being electrically coupled to the first and second wind turbine generators via the first and second AC to DC converters, and wherein the first and second half bridge sections maintain constant current at the at least one superconducting DC conductor based on current supplied by each of the first and second wind turbine generators.

* * * * *